United States Patent
Anandan et al.

(10) Patent No.: US 9,666,852 B2
(45) Date of Patent: May 30, 2017

(54) COMPOSITE SEPARATOR WITH ALIGNED PARTICLES

(71) Applicant: Ford Global Technologies, LLC, Dearborn, MI (US)

(72) Inventors: Venkataramani Anandan, Farmington Hills, MI (US); Andrew Robert Drews, Ann Arbor, MI (US); John Matthew Ginder, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/504,762

(22) Filed: Oct. 2, 2014

(65) Prior Publication Data

US 2016/0099453 A1    Apr. 7, 2016

(51) Int. Cl.
*H01M 2/14*    (2006.01)
*H01M 2/16*    (2006.01)
(Continued)

(52) U.S. Cl.
CPC ............ *H01M 2/18* (2013.01); *H01M 2/145* (2013.01); *H01M 2/166* (2013.01);
(Continued)

(58) Field of Classification Search
CPC ........ H01M 2/18; H01M 2/145; H01M 2/166; H01M 10/052; H01M 10/056;
(Continued)

(56) References Cited

U.S. PATENT DOCUMENTS 5,607,485 A    3/1997  Gozdz et al.
6,059,943 A *  5/2000  Murphy ................. C08J 5/2275
                                                    204/296

(Continued)

FOREIGN PATENT DOCUMENTS

JP    2010040439 A  *  2/2010
WO    2012152357 A1    11/2012

OTHER PUBLICATIONS

Kiesow et al. "Bicontinuous Zeolite Polymer Composite Membranes Prepared via Float Casting", J. Am. Chem. Soc., 2013, 135 (11), pp. 4380-4388.*

(Continued)

*Primary Examiner* — Gregg Cantelmo
(74) *Attorney, Agent, or Firm* — Damian Porcari; Brooks Kushman P.C.

(57) ABSTRACT

An ionically conductive composite separator for a rechargeable battery and methods for producing the same are provided. The separator may include a bulk material having an anode side and a cathode side and a thickness extending therebetween and a region of aligned particles extending across the bulk material thickness. The aligned particles may be formed as a particle chain and the particles may be formed of a solid electrolyte material. The ionically conductive separator may be formed by providing a plurality of particles within a bulk material and applying an AC electric field to the particles and the bulk material while the bulk material is in a liquid state to align the particles into at least one ionically conductive aligned particle region within the bulk material.

16 Claims, 4 Drawing Sheets

(51) Int. Cl.
    H01M 2/18      (2006.01)
    H01M 10/052    (2010.01)
    H01M 10/056    (2010.01)
(52) U.S. Cl.
    CPC ....... *H01M 10/052* (2013.01); *H01M 10/056* (2013.01); *H01M 2300/0068* (2013.01); *H01M 2300/0082* (2013.01); *H01M 2300/0088* (2013.01)
(58) Field of Classification Search
    CPC . H01M 2300/0068; H01M 2300/0082; H01M 2300/0088
    See application file for complete search history.

(56) References Cited

U.S. PATENT DOCUMENTS

| | | | |
|---|---|---|---|
| 6,372,387 B1* | 4/2002 | Kawakami | H01M 10/052 429/188 |
| 7,695,865 B2 | 4/2010 | Saito et al. | |
| 2005/0255360 A1* | 11/2005 | Post | H01B 1/122 429/465 |
| 2006/0194116 A1* | 8/2006 | Suzuki | H01M 2/166 429/251 |
| 2008/0292968 A1* | 11/2008 | Lee | H01M 2/14 429/247 |
| 2011/0003211 A1 | 1/2011 | Hudson et al. | |
| 2011/0027656 A1 | 2/2011 | Chiang et al. | |
| 2011/0053001 A1* | 3/2011 | Babic | C04B 35/486 429/322 |
| 2011/0227000 A1 | 9/2011 | Ruoff et al. | |
| 2012/0088029 A1* | 4/2012 | Seo | H01M 2/1673 427/126.4 |
| 2012/0156577 A1* | 6/2012 | Bulovic | C25B 1/003 429/417 |
| 2012/0308871 A1* | 12/2012 | Pascaly | C04B 35/62218 429/144 |
| 2012/0320492 A1 | 12/2012 | Radivojevic et al. | |
| 2013/0224632 A1 | 8/2013 | Roumi | |
| 2013/0266886 A1* | 10/2013 | Hatakeyama | C08J 5/2206 429/479 |
| 2014/0065513 A1* | 3/2014 | Badding | C08J 5/22 429/492 |
| 2015/0255767 A1* | 9/2015 | Aetukuri | C08J 5/22 429/249 |

OTHER PUBLICATIONS

Mahlmann et al. "Preparation of Composite Membranes with Bicontinuous Structure", Langmuir, 2012, 28 (21), pp. 8197-8204.*
Tomer, V. et al.,"High- and low-field dielectric characteristics of dielectrophoretically aligned ceramic/polymer nanocomposites," J. Appl. Phys. 103, 034115 (2008), Abstract Only, 2 pgs.
van den Ende, D. A., "Improving the d33 and g33 properties of the 0-3 piezoelectric composites by dielectrophoresis," J. Appl. Phys., V. 107, Issue 2 (2010), Abstract Only, 1 pg.

* cited by examiner

COMPOSITE SEPARATOR WITH ALIGNED PARTICLES

TECHNICAL FIELD

This disclosure relates to separators including aligned particles for improved ionic conductivity.

BACKGROUND

Rechargeable batteries (e.g., lithium-ion batteries) generally include separators, which provide mechanical and electronic separation of the electrodes while allowing ionic conduction. One common separator is a porous polymer film that is soaked in a liquid electrolyte. However, the common liquid electrolytes for many batteries (e.g., Li-ion batteries) may be flammable and could contribute to a fire hazard in severe incidents. If an overcharge of a Li-ion battery occurs lithium dendrites may grow at the negative electrode and penetrate the porous membrane, leading to an internal short circuit. If the two electrodes make electrical contact, the cell can begin to self-discharge through the short, which may lead to a thermal-runaway event. Thermal-runaway may, in turn, lead to a fire hazard.

SUMMARY

In at least one embodiment, an ionically conductive composite separator for a rechargeable battery is provided comprising a bulk material having an anode side and a cathode side and a thickness extending therebetween; and a region of aligned particles extending across the bulk material thickness. The aligned particles may be an aligned particle chain.

In one embodiment, a volume fraction of particles in the region of aligned particles may be at least 85%. In another embodiment, a volume fraction of particles in the separator may be from 0.1 to 20%. The separator may include a plurality of regions of aligned particles extending across the bulk material thickness. The aligned particles may include solid electrolyte particles. In one embodiment, the region of aligned particles may be substantially linear.

The bulk material may include polyethylene oxide (PEO), polyethylene-glycol (PEG), polymethylmethacrylate (PMMA), or polyacrylonitrile (PAN). The aligned particles may include LLZO, LiPON, LISICON, Thio-LISICON, Li2S-P2S5, Li—Al—Ge—PO4, Li—Ti—Al—PO4, Li—V—Si—O, LiBSiO, LiBON, lithium lanthanum titanate, or NASICON. In one embodiment, the aligned particles include a dielectric material. The region of aligned particles may have a width of 1 to 5 particles.

In at least one embodiment, a rechargeable battery is provided comprising an anode and a cathode and an ionically conductive separator disposed between the anode and the cathode, the separator including: a bulk material having a thickness extending from an anode side to a cathode side of the separator and a region of aligned particles extending across the thickness of the bulk material.

In one embodiment, the aligned particles are an aligned particle chain. A volume fraction of particles in the region of aligned particles may be at least 85%. The separator may include a plurality of regions of aligned particles extending across the bulk material thickness. In one embodiment, a volume fraction of particles in the separator is from 0.1 to 20%.

In at least one embodiment, a method of forming an ionically conductive composite separator for a rechargeable battery is provided. The method may include providing a plurality of particles within a bulk separator material and applying an AC electric field to the particles and the bulk separator material while the bulk separator material is in a liquid state to align the particles into at least one ionically conductive aligned particle region within the bulk separator material.

In one embodiment, the AC electric field has a strength of 100 to 2,000 V/mm and a frequency of 10 Hz to 10 kHz. The electric field may be applied for 1 second to 1 hour. The method may include heating the bulk material such that it is in a liquid state prior to the applying step.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To address the issues known to affect conventional porous polymer separators, alternative separator materials and/or configurations may be beneficial. Separators formed from dense sheets of solid electrolyte (SE) could potentially address both the flammability and dendrite formation issues. However, dense SE sheets generally cannot be used in current manufacturing techniques that require a flexible separator. A non-porous, ionically conductive polymer membrane would be another potentially attractive solution, but current polymers do not have sufficient conductivity to be useful in some applications (e.g., automotive applications). A composite of a polymer with randomly dispersed particles of SE could potentially combine some of the advantages of both options. However, at high solids loadings, the membrane is both highly conductive and brittle, while at low loadings, it has poor conductivity but is flexible. Accordingly, an alternative approach that can use SE particles more efficiently to provide high-level performance at moderate loadings would address the known issues of the conventional separator and the short-comings of potential alternatives.

Figure 1:
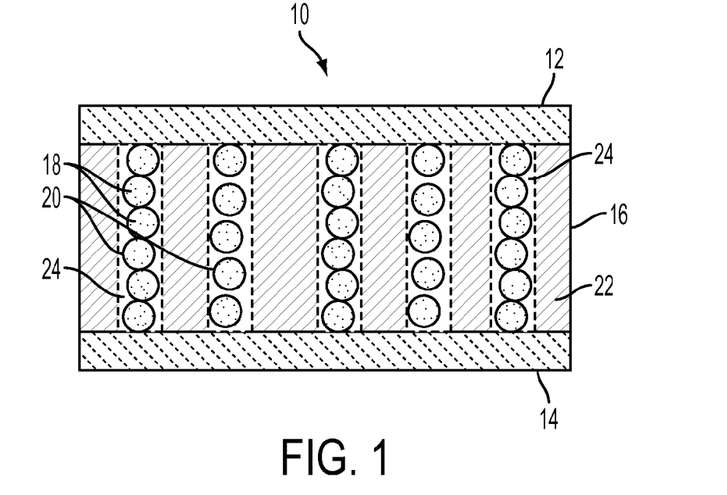
FIG. 1 is a schematic cross-section of a composite separator having aligned particles, according to an embodiment.

With reference to FIG. 1, a schematic cross-section of a rechargeable battery 10 (e.g., a lithium-ion battery) is shown having a negative electrode (anode) 12, a positive electrode (cathode) 14, and a composite separator 16. Within the bulk of the separator 16 are a plurality of particles 18. The particles 18 may be arranged into one or more aligned groups, such as strings or chains 20 that extend across a thickness of the separator 16 (e.g., from the anode side to the cathode side). The strings or chains 20 may be unbroken, however, they may also include some gaps or breaks. The chains 20 may be linear or substantially linear and may form a straight line across the thickness of the separator 16. In some embodiments, the chain(s) 20 may be non-linear, but still extend across the thickness of the separator 16 to form a high conduction path. In one embodiment, the chains 20 are oriented parallel to the thickness direction (i.e., perpendicular to the anode and cathode). The chains may have a thickness of a single particle or several particles (e.g., up to 5 or up to 10 particles). As shown in FIG. 1, the chains 20 may be formed of particles 18 that are in contact with one another or the particles may be closely adjacent but not in physical contact. In one embodiment, the chain(s) 20 may extend unbroken across the entire thickness of the separator 16. In another embodiment, the chain(s) 20 may extend substantially unbroken across the entire thickness of the separator 16, having small gaps in the chain 20. The chain(s) 20 may also extend across a majority of the thickness of the separator 16 or over at least a certain percentage of the thickness. For example, the chain(s) 18 may extend across at least 50, 60, 70, 80, 90, or 95 percent of the thickness of the separator 16.

While the particles 18 are shown in FIG. 1 as being circular in cross-section, the particles 18 may have any shape. For example, the particles 18 may be spherical, platelets, discs, needle-like, cylindrical, irregular, flakes, cubical, angular, acicular, lath, or other known particle shapes. The chains 20 are shown in FIG. 1 as having a single particle 18 width, however, the chains 20 may be more than one particle wide, for example, up to 3, 5, or 10 particles wide. The particles 18 may have any suitable size or diameter, for example, 3 nm to 100 μm, or any sub-range therein, such as 50 nm to 50 μm or 500 nm to 30 μm. The maximum particle size may be limited by the thickness of the separator. In one embodiment, the particles 18 may have a maximum particle size/diameter of one half the thickness of the separator 16. The size of the particles 18 may selected or prepared based on factors such as interfacial resistance, mechanical strength, and ionic conductivity. If the particles are not ionically conductive, then the size of the particles may be based on factors including the mechanical and ionic conductivity properties of the final composite separator 16.

In one embodiment, the chains 20 may have a width of 5 nm to 300 μm, or any sub-range therein. For example, the chains 20 may have a width of 5 nm to 200 μm, 5 nm to 100 μm, 50 nm to 100 μm, 100 nm to 100 μm, 100 nm to 50 μm, 100 nm to 30 μm, 100 nm to 10 μm, or 100 nm to 1 μm. The chains 20 may extend across the entire thickness of the separator 16, which may be from 5 to 100 μm, or any sub-range therein. For example, the separator 16 may have a thickness of 5 to 30 μm, 5 to 25 μm, 5 to 20 μm, 5 to 15 μm, or 5 to 10 μm.

The separator 16 may include any amount of particles 18 that provides sufficient ionic conductivity for a battery's requirements. The alignment of the particles 18 reduces the number of particles 18 needed to attain a certain level of ionic conductivity, compared to randomly dispersed particles. Accordingly, the volume fraction of particles 18 in the composite separator 16 may be reduced in order to maintain good flexibility of the separator 16 while also increasing the ionic conductivity. In one embodiment, the separator 16 includes from 0.1 to 40% by volume of particles 18, or any sub-range therein. In another embodiment, the separator 16 includes from 0.1 to 20% by volume of particles 18. In another embodiment, the separator 16 includes from 0.1 to 15% by volume of particles 18. In another embodiment, the separator 16 includes from 0.1 to 10% by volume of particles 18. In another embodiment, the separator 16 includes from 0.1 to 5% by volume of particles 18. The volume percent of the particles 18 may be adjusted based on factors such as the shape of the particle, size of the particle, ionic conductivity of the particle, or other properties of the particles and/or the composite separator.

In at least one embodiment, the particles 18 include solid electrolyte (SE) particles (also known as fast ion conductors). These particles may be electrically insulating but ionically conductive. Non-limiting examples of solid electrolyte materials include lithium lanthanum zirconium oxide (LLZO, e.g., $Li_7La_3Zr_2O_{12}$), lithium phosphorus oxynitride (LiPON, e.g., $Li_{3.3}PO_{3.8}N_{0.24}$ to $Li_{3.6}PO_{3.3}N_{0.69}$), LISICON or Thio-LISICON (Lithium SuperIonic CONductor, e.g., $Li_{3.25}Ge_{0.25}P_{0.75}S_4$), $Li_2S$—$P_2S_5$, Li—Al—Ge—$PO_4$, Li—Ti—Al—$PO_4$, Li—V—Si—O, LiBSiO, LiBON, lithium lanthanum titanate, and NASICON.

The particles 18 may also include dielectric or ceramic particles that have little or no ionic conductivity. Non-limiting examples of such particles may include barium titanate (e.g., $BaTiO_3$), alumina ($Al_2O_3$), Silica (SiO2), Ceria ($CeO_2$), and Titanium oxide ($TiO_2$). It has been found that high surface area ceramic particles may enhance the ionic conductivity of a surrounding polymer, even if the ceramic particles themselves do not have ionic conductivity. Without being held to any particular theory, it is believed that this effect is due to a surface interaction wherein the polymer chains near the surface of the particles have a higher free volume and thus allow for a higher ionic diffusivity. Aligning these particles into chains 20 may further enhance the ionic conductivity of the composite separator 16 by connecting or aligning these regions of higher free volume into chains that span the separator 16.

The particles 18 may also include particles having anisotropic dielectric properties and/or shapes. Particles 18 having anisotropic shapes may include needle-shaped particles or plates. The long axes of the particles 18 may be aligned with each other to form the chains 20. Alternatively, in some embodiments, the long axes may be aligned perpendicular to the direction of the chain 20 such that the particles are side-by-side rather than tip-to-tip.

The composite separator 16 includes a bulk or matrix material 22 that forms a bulk of the separator 16 and surrounds or encapsulates the chains 20 of particles 18. The bulk material 22 may be a polymer, which may or may not be an ionic conductor. Non-limiting examples of suitable ionically conductive polymers include polyethylene oxide (PEO), polyethylene-glycol (PEG), polymethylmethacrylate (PMMA), and polyacrylonitrile (PAN). Non-limiting examples of suitable non-ionically conductive polymers include epoxies, polypropylene (PP), and polyethylene (PE).

In at least one embodiment, the particles 18 may be aligned within one or more ionically conductive aligned particle regions 24. The aligned particle regions may be three-dimensional regions extending across a thickness of the matrix material 22 of the composite separator 16 from the anode side to the cathode side. The regions 24 may encapsulate or surround the particle chains 20 described above. For example, a region 24 may be a defined shape such as a cylinder or rectangular prism, or it may be irregular. The region(s) 24 may each surround a chain 20. Each region 24 may extend across the entire thickness of the separator (e.g., from the anode side to the cathode side). The region 24 may have a width or diameter that is the same as the width of the chain 20 at its widest point or the region 24 may be defined as having the same width as the chain 20 along its length (e.g., the region 24 width corresponds to the chain width along the length of the chain). The aligned particle regions may have a high volume fraction of particles 18 compared to the matrix material 22. In one embodiment, the volume fraction of particles 18 in the regions 24 is at least 75%. In another embodiment, the volume fraction of particles 18 in the regions 24 is at least 80%. In another embodiment, the volume fraction of particles 18 in the regions 24 is at least 85%. In another embodiment, the volume fraction of particles 18 in the regions 24 is at least 90%. In another embodiment, the volume fraction of particles 18 in the regions 24 is at least 95%.

Figure 2:
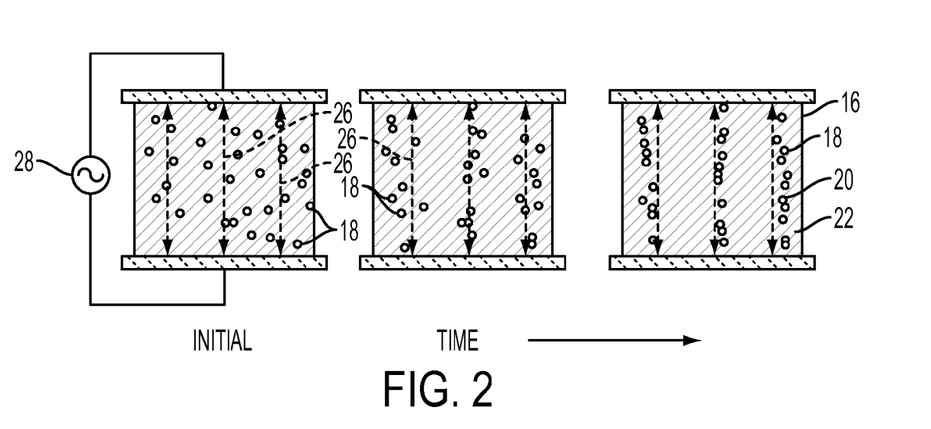
FIG. 2 is a schematic of a particle alignment process, according to an embodiment.

The particles 18 may be aligned into chains 20 in the matrix material 22 using any suitable method. In at least one embodiment, the particles 18 are aligned into chains 20 by dielectrophoretic alignment, as illustrated in FIG. 2. Dielectrophoretic alignment may include applying an electric field 26 normal to the surface of the composite separator 16 using a voltage source 28 while the matrix material 22 (e.g., polymer) is in a liquid state. In one embodiment, the electric field 26 is an alternating electric field (AC electric field). However, it may be possible to use a DC field. An AC electric field 26 may cause the particles 18 to develop oscillating dipole moments and electrical forces and torques that generally encourage alignment of the dipoles along the field direction and drift in the plane of the separator 16 (e.g., plane parallel to the anode and cathode surfaces) to regions where the local field is enhanced by an adjacent particle. By this action, the particles 18 may self-assemble into chains 20 that span at least a portion of the thickness of the separator 16, as shown in FIGS. 1 and 2. Once the particles 18 have been given sufficient time to form the chains, the matrix material 22 may be allowed to solidify, thereby locking the chains 20 into position.

Dielectrophoretic alignment may be used to align any type of particle 18 in a matrix material 22, provided that there is a difference in dielectric constants for the materials of the particles 18 and the matrix material 22. The force applied to the particles 18 by the AC electric field may vary depending on the properties of the particles 18 and the matrix material 22. For example, the strength of the force may depend on the electrical properties of the particles 18 and matrix material 22, on the particles' shape and size, and on the strength and/or frequency of the electric field. The alignment of the particles 18 into chains 20 in the matrix material 22, as described above, may be affected by properties such as the polarizabilities of the particles 18 and the matrix material 22, the size and/or shape of the particles 18 and the viscosity of the matrix material 22 when in a liquid phase.

The electric field 26 may be an AC electric field having any suitable frequency to apply a force to the particles 18 and facilitate their alignment. In at least one embodiment, the frequency of the AC electric field is from 10 Hz to 10,000 Hz (10 kHz), or any sub-range therein. For example, the AC electric field 26 may have a frequency of 100 to 8,000, 500 to 7,000, 1,000 to 6,000, or 3,000 to 5,000 Hz. In some particle-matrix material systems, the frequency used may affect the orientation of the particles 18 within the chains 20. For example, over certain frequency ranges, particles 18 having a long axis (e.g., needle-like or plate-shaped particles) may form chains 20 with their long axes perpendicular to the field direction, rather than parallel to it. Accordingly, the frequency of the AC electric field 26 may be controlled to adjust the orientation of the particles 18 in the chains 20. The frequency of the AC electric field 26 may be constant throughout the dielectrophoretic alignment or it may be adjusted during the alignment (e.g., dynamically adjusted) to control the alignment and/or orientation of the particles 18.

The electric field 26 may have any suitable strength to apply a force to the particles 18 and facilitate their alignment. In at least one embodiment, the strength of the electric field 26 is from 100 V/mm to 2,000 V/mm, or any sub-range therein. For example, the electric field 26 may have a strength of 200 to 1,500, 250 to 1,200, 300 to 1,000, 350 to 750, or 400 to 600 V/mm. The strength of the electric field 26 may be constant throughout the dielectrophoretic alignment or it may be adjusted during the alignment (e.g., dynamically adjusted) to control the alignment of the chains 20. The electric field 26 may be applied to the particles 18 and liquid-phase matrix material 22 for any suitable length of time to facilitate alignment of the particles 18 into chains 20. In at least one embodiment, the electric field 26 may be applied for 1 second to 3 hours, or any sub-range therein. For example, the electric field may be applied for 1 second to 1 hour, 1 second to 30 minutes, 1 second to 15 minutes, 1 second to 5 minutes, 1 second to 1 minute, 1 to 45 seconds, 5 to 45 seconds, 5 to 30 seconds, or 10 to 30 seconds. In general, the particles 18 will be more aligned the longer that the electric field 26 is applied. Accordingly, independent of the field strength or frequency, increasing the time of the dielectrophoretic alignment may allow for increased alignment of the particles 18 into chains 20 (e.g., the particles have less lateral deviation from the long axis). However, longer alignment times may also increase the possibility of particle agglomeration.

Figure 3:
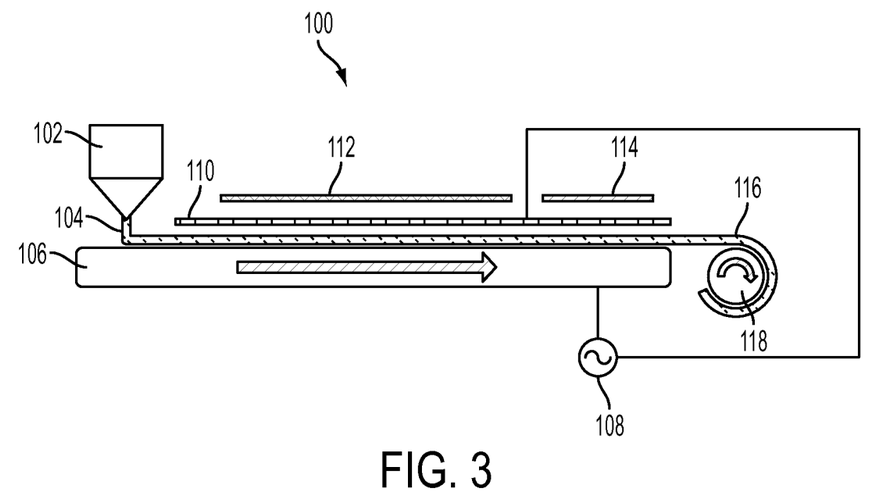
FIG. 3 is a schematic of a composite separator forming and aligning process, according to an embodiment.

The alignment of the particles 18 in the matrix material 22 may be performed while the matrix material 22 is in a liquid state. Non-limiting examples of the liquid state of the matrix material 22 include a polymer melt, a solution with a removable solvent, and a reactive mixture of liquids (e.g., an epoxy). In one embodiment, the particles 18 of the separator 16 may be aligned when the separator is formed, as shown in FIG. 3. The particles 18 may be incorporated into or added to the matrix material 22, while the matrix material is in a liquid state. The particles 18 may initially be randomly dispersed or dispersed without any predetermined alignment. While the matrix material is still in a liquid state, an alignment process may be performed, such as dielectrophoretic alignment, to form the chains 20 and the ionically conductive aligned particle regions 24.

With reference to FIG. 3, an embodiment of an alignment system 100 is shown for aligning particles 18 during an initial forming of the separator 16. A vessel 102 may hold a polymer melt 104 having particles 18 and a matrix material 22 included therein. The vessel 102 may cast the melt 104 onto a moving conveyor 106, which may include a spreader for a separator 16 (not shown). A voltage source 108 may be connected to the conveyor 106 and an electrode 110 to produce an electric field between the conveyor 106 and the electrode 110. The electrode 110 is shown located above the conveyor 106 in FIG. 3, however, any suitable configuration may be used to provide an electric field to the melt 104. As the melt 104 passes through the electric field, the particles 18 are able to align into chains 20 via dielectrophoretic alignment, as described above.

A heater 112 may be included in the system 100 to ensure that the melt 104 stays in a liquid state and does not solidify prior to the completion of the alignment of particles 18. The heater 112 may be any suitable device for increasing the temperature of the matrix material 22. Non-limiting examples may include a hot-air heater, infrared energy, microwave energy, or others. To assist in cooling the melt 104 down to its melting temperature, a cooling plate 114 may be positioned and configured to cool the melt 104 in order to solidify it and lock the particles 18 into their aligned configuration. Other methods of cooling other than a cooling plate may also be used, such as the use of cooled air, a cooled drum, or others. The electrode 110 may extend into the cooling region such that the electric field is maintained as the matrix material solidifies. Extending the electrode into the cooling region may prevent the particles 18 from becoming unaligned as the matrix material 22 solidifies. After the matrix material 22 has solidified, the newly formed and aligned separator 116 may be removed from the conveyor 106. The aligned separator 116 may be wound onto a pick-up roll 118 for later use or may be immediately further processed (e.g., cut to size).

The degree of alignment of the particles 18 may be controlled by the strength and/or frequency of the electric field (described above) and/or by the amount of time exposed to the electric field while the matrix material 22 is in the liquid state. The amount of time spent exposed to the electric field may be controlled by adjusting the speed of the conveyor 106 and/or the length of the conveyor 106 or electrode 110. If a longer exposure time is desired, the conveyor speed may be reduced and/or the size of the length of the conveyor 106 or the electrode 212 may be increased. If a shorter exposure time is desired, then the opposite adjustments may be made (e.g., faster conveyor speed, smaller conveyor/electrode). As described above, the alignment of the particles may be performed while the separator is in a liquid state. In addition to a polymer melt, as shown and described with respect to FIG. 3, other non-limiting examples of the liquid state may also include a solution with a removable solvent or a reactive mixture. One of ordinary skill in the art will appreciate that the system 100 of FIG. 3 may be modified in order to align particles 18 within matrix materials in other liquid states.

Figure 4:
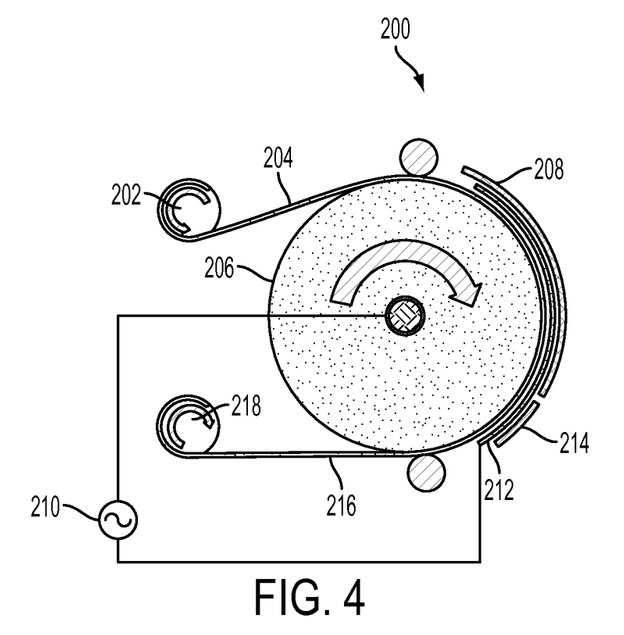
FIG. 4 is a schematic of a re-melt aligning process, according to an embodiment.

In another embodiment, an example of which is shown in FIG. 4, the separator 16 may be formed and solidified prior to the alignment process and may be returned to a liquid state for alignment. The particles 18 may initially be randomly dispersed in the matrix material 22, or otherwise dispersed without any predetermined alignment. A portion or all of the matrix material 22 may then be returned to a liquid state, for example, by melting. An electrode may then be configured to produce an electric field in the region of the liquid matrix material 22 to align the particles 18 into chains 20 via dielectrophoretic alignment, as described above. Once a certain amount of alignment has occurred, the matrix material 22 may allowed to solidify, thereby locking the particles 18 into their aligned configuration. The matrix material 22 may be actively cooled, for example, using a cooling plate, cooled air, or other methods, or it may be allowed to passively cool to its melting temperature at ambient conditions.

With reference to FIG. 4, an embodiment of a re-melt or re-processing system 200 is shown. A feed roll 202 may be loaded with an unaligned separator 204 having particles 18 dispersed within a matrix material 22. The particles 18 may be randomly dispersed or otherwise not aligned in a predetermined manner. The unaligned separator 204 may be unrolled onto a rotating drum 206. A heater 208, such as a heater plate, may be positioned and configured to heat the separator 204 such that at least a portion of the matrix material 22 of the separator 204 melts. A voltage source 210 may be connected to the drum 206 and an electrode 212 to produce an electric field between the drum 206 and the electrode 212. In one embodiment, the electrode may have a contour that follows an outer contour of the drum 206, such that the electric field is perpendicular to the surface of the separator (e.g., parallel to the thickness direction). As the melted portion of the matrix material 22 passes through the electric field, the particles 18 are able to align into chains 20 via dielectrophoretic alignment, as described above.

The degree of alignment may be controlled by the strength and/or frequency of the electric field (described above) and/or by the amount of time exposed to the electric field while the matrix material 22 is in the liquid state. The amount of time spent exposed to the electric field may be controlled by adjusting the speed of rotation of the drum 206 and/or the size/diameter of the drum 206 or electrode 212. If a longer exposure time is desired, the drum speed may be reduced and/or the size of the drum 206 or the size of the electrode 212 may be increased. If a shorter exposure time is desired, then the opposite adjustments may be made (e.g., faster drum speed, smaller drum/electrode). To assist in cooling the liquid matrix material down to its melting temperature, a cooling plate 214 may be positioned and configured to cool the separator 204 in order to solidify it and lock the particles 18 into their aligned configuration. Other methods of cooling other than a cooling plate may also be used, such as the use of cooled air, a cooled drum, or others. The electrode 212 may extend into the cooling region such that the electric field is maintained as the matrix material solidifies. Extending the electrode into the cooling region may prevent the particles 18 from becoming unaligned as the matrix material 22 solidifies. After the matrix material 22 has solidified, the aligned separator 216 may be removed from the drum 206, for example, by peeling. The aligned separator may be wound onto a pick-up roll 218 for later use or may be immediately further processed (e.g., cut to size).

While FIG. 4 shows the system 200 as using a cylindrical drum 206, other configurations may be utilized. For example, the unaligned separator 204 may be unrolled or placed on a flat transport system (e.g., a conveyor belt) and moved passed a heater 208 and an electric field. The heater 208 may be any suitable device for increasing the temperature of the matrix material 22. Non-limiting examples may include a hot-air heater, infrared energy, microwave energy, or others. In addition, the matrix material 22 may be solidified using methods in addition to, or instead of, cooling. For example, a polymer melt may be cured by exposure to UV light or by the addition of a curing agent (e.g., a catalyst). The electric field may be maintained during these alternative solidifying processes, similar to above with respect to the cooling plate.

EXAMPLES

Figure 5A:
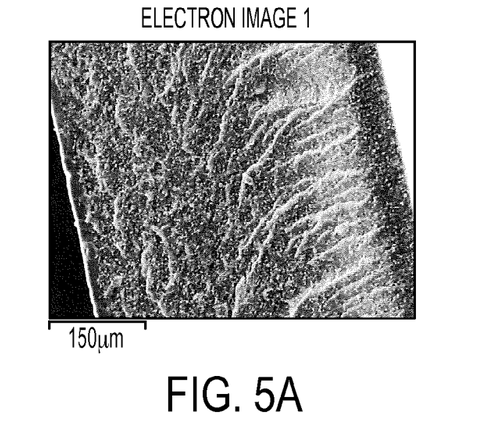
FIG. 5A is an SEM image of a cross-section of an epoxy film including $BaTiO_3$ particles formed without an external electric field.
Figure 5B:
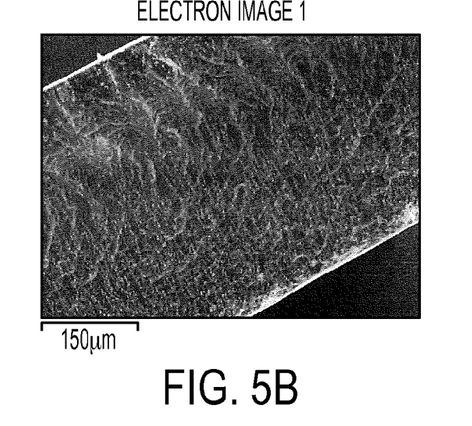
FIG. 5B is an SEM image of a cross-section of an epoxy film including $BaTiO_3$ particles formed with an external electric field.

With reference to FIGS. 5A and 5B, sample composite separators were prepared without and with dielectrophoretic alignment, respectively. Both separators were prepared with barium titanate (BaTiO$_3$) particles dispersed in an uncured film of epoxy. The separator in FIG. 5A was cured by successively raising the temperature from room temperature to 80° C., without an external electric field applied. The separator in FIG. 5B was cured in the same manner, but with an AC electric field of 500 V/mm applied at a frequency of 4,000 Hz until the curing completed. The samples were then fractured to produce cross-sections for imaging using scanning electron microscopes. As shown in FIG. 5A, the sample cured with no external electric field applied has a random dispersion of BaTiO$_3$ particles, with no alignment of the particles. In contrast, the sample cured under an electric field, shown in FIG. 5B, has a plurality of chains of BaTiO$_3$ particles traversing the cross-section of the separator. The particles are aligned into chains of about one particle width and extend across the entire thickness of the separator.

Figure 6A:
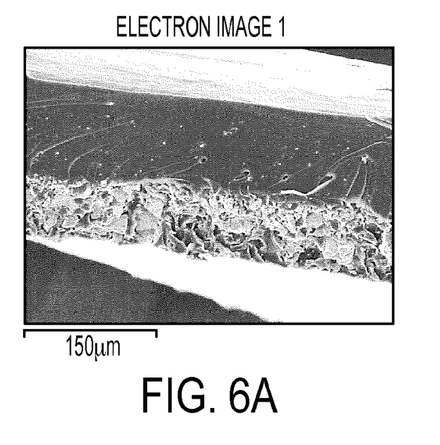
FIG. 6A is an SEM image of a cross-section of an epoxy film including LLZO particles formed without an external electric field.
Figure 6B:
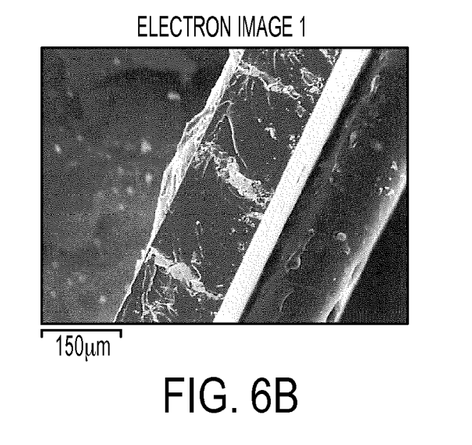
FIG. 6B is an SEM image of a cross-section of an epoxy film including LLZO particles formed with an external electric field.

With reference to FIGS. 6A and 6B, sample composite separators were prepared without and with dielectrophoretic alignment, respectively. Both separators were prepared with lithium lanthanum zirconium oxide (LLZO) solid electrolyte particles dispersed in an uncured film of epoxy. The separator in FIG. 6A was cured by successively raising the temperature from room temperature to 80° C., without an external electric field applied. The separator in FIG. 6B was cured in the same manner, but with an AC electric field of 500 V/mm applied at a frequency of 4,000 Hz until the curing completed. The samples were then fractured to produce cross-sections for imaging using scanning electron microscopes. As shown in FIG. 6A, the LLZO particles in the sample cured with no external electric field applied have settled to one side of the separator and do not form any aligned chains. In contrast, the sample cured under an electric field, shown in FIG. 6B, has a plurality of chains of LLZO particles traversing the cross-section of the separator. The particles are aligned into chains of about one particle width and extend across the entire thickness of the separator.

Figure 7:
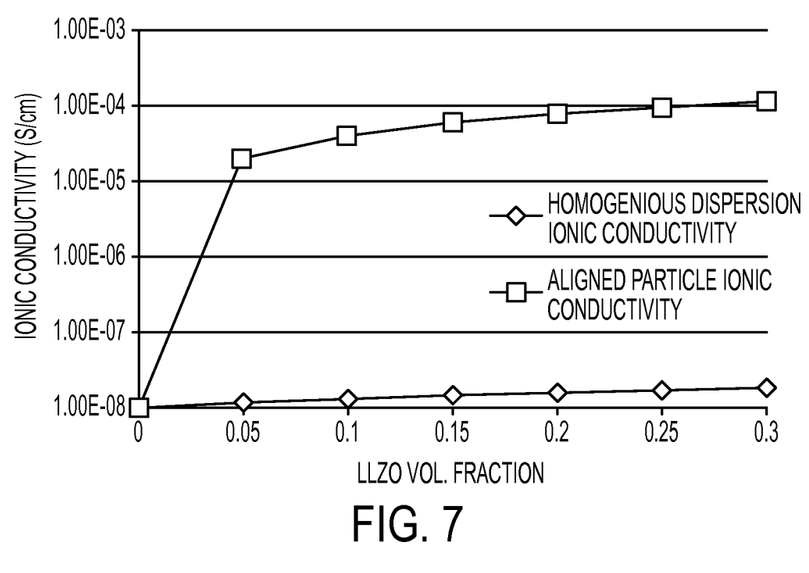
FIG. 7 is a graph showing calculated ionic conductivities for a separator having homogeneously dispersed particles and a disclosed separator having aligned particles.

With reference to FIG. 7, a graph is shown of calculated ionic conductivity values for a separator with homogeneously dispersed particles compared to a composite separator with aligned particles. The ionic conductivity values for a homogeneous dispersion were calculated using the following Maxwell equation:

$$\frac{\sigma}{\sigma_m} = 1 + 3\left(\frac{\sigma_d - \sigma_m}{\sigma_d + 2\sigma_m}\right)\phi$$

Where $\sigma$, $\sigma_m$, and $\sigma_d$ are the ionic electrical conductivities of the composite separator, the matrix material, and the particles, respectively, and $\phi$ is the volume fraction of the particles.

For the separator with aligned particles, the aligned particle chains were approximated as solid pillars, rather than as individual particles. The ionic conductivity values were calculated using a weighted parallel conductivity equation:

$$\sigma = \sigma_d f + \sigma_m (1-f)$$

Where $\sigma$, $\sigma_m$, and $\sigma_d$ are the same as above and f is the volume fraction of the particles.

The calculations used to produce the graph of FIG. 7 were performed using LLZO as the particle material and PEO as the bulk matrix material. LLZO has an ionic conductivity of $4 \times 10^{-4}$ S/cm and PEO has an ionic conductivity of $1 \times 10^{-8}$ S/cm. As shown in FIG. 7, the ionic conductivity of the composite separator with aligned particles has an ionic conductivity that is several orders of magnitude higher at a given particle volume fraction than a separator with homogeneously dispersed particles. This greatly increased ionic conductivity per particle volume allows for the amount of particles to be reduced in the separator, thereby allowing the separator to maintain desirable mechanical properties, such as flexibility.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An ionically conductive composite rechargeable battery separator, comprising:
   an ionically conductive polymer bulk material having an anode side and a cathode side and a thickness extending therebetween; and
   a region of aligned solid electrolyte particles extending within the bulk material in a straight line parallel to the bulk material thickness across an entire thickness of the separator, wherein a volume fraction of particles in the region of aligned solid electrolyte particles is at least 90%.

2. The separator of claim 1, wherein the aligned solid electrolyte particles are an aligned particle chain.

3. The separator of claim 1, wherein a volume fraction of particles in the region of aligned solid electrolyte particles is at least 95%.

4. The separator of claim 1 further comprising a plurality of spaced apart regions of aligned solid electrolyte particles extending in a straight line parallel to the bulk material thickness across the entire thickness of the separator and having a volume fraction of particles in the region of aligned solid electrolyte particles is at least 90%.

5. The separator of claim 1, wherein the region of aligned particles has a width of 100 nm to 30 µm.

6. The separator of claim 1, wherein a volume fraction of particles in the separator is from 0.1 to 5%.

7. The separator of claim 1, wherein the bulk material includes polyethylene oxide (PEO), polyethylene-glycol (PEG), polymethylmethacrylate (PMMA), or polyacrylonitrile (PAN).

8. The separator of claim 1, wherein the aligned particles include LLZO, LiPON, LISICON, Thio-LISICON, Li$_2$S—P$_2$S$_5$, Li—Al—Ge—PO$_4$, Li—Ti—Al—PO$_4$, Li—V—Si—O, LiBSiO, LiBON, lithium lanthanum titanate, or NASICON.

9. The separator of claim 1, wherein the aligned particles include a dielectric material.

10. The separator of claim 1, wherein the region of aligned particles has a width of 1 to 5 particles.

11. A rechargeable battery comprising:
    an anode and a cathode; and
    a separator disposed between the anode and the cathode, the separator including:
       an ionically conductive polymer bulk material having a thickness extending from an anode side to a cathode side of the separator; and
       an aligned chain of solid electrolyte particles within the bulk material and extending in a straight line parallel to the bulk material thickness across an entire thickness of the separator.

12. The battery of claim 11, wherein the aligned particles are an unbroken particle chain.

13. The battery of claim 11, wherein a region encapsulating the aligned chain of particles has a volume fraction of particles in the region of at least 95%.

14. The battery of claim 11, wherein the separator further includes a plurality of spaced apart aligned chains of solid electrolyte particles extending in a straight line parallel to the bulk material thickness across the entire thickness of the separator.

15. The battery of claim 11, wherein a volume fraction of particles in the separator is from 0.1 to 5%.

16. The battery of claim 11, wherein the solid electrolyte particles are formed of LLZO, LiPON, LiBON, and/or lithium lanthanum titanate.

* * * * *